Nov. 24, 1964  G. E. FRAGER ETAL  3,158,205
SEMIMOUNTED ONE-WAY PLOW
Filed Nov. 17, 1961
2 Sheets-Sheet 1

INVENTORS.
Glenn E. Frager
Francis H. Stansel
BY
Hovey, Schmidt, Johnson & Hovey
ATTORNEYS.

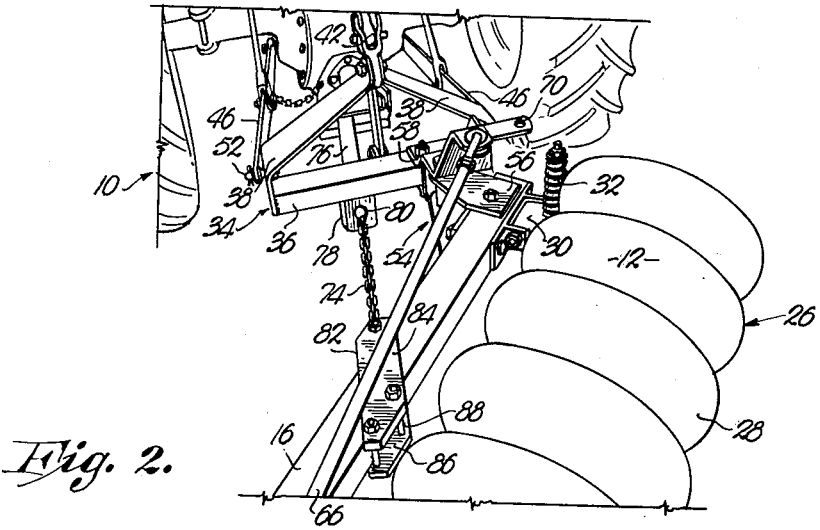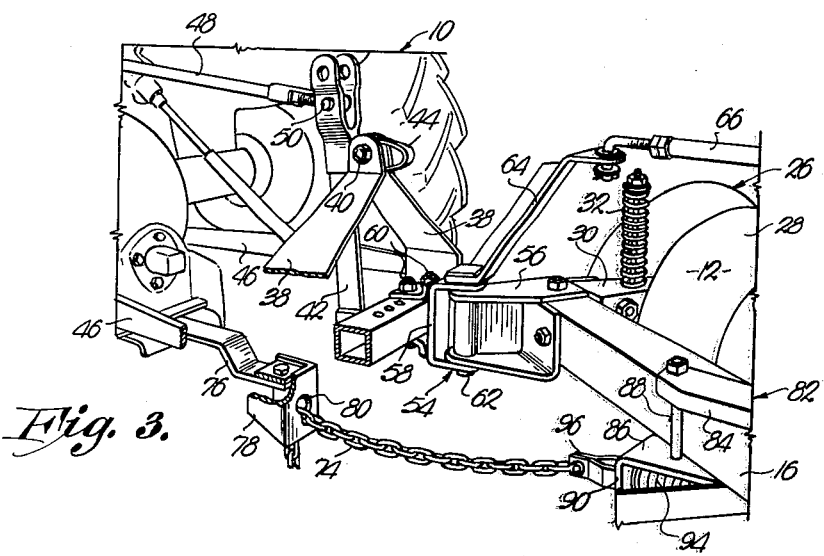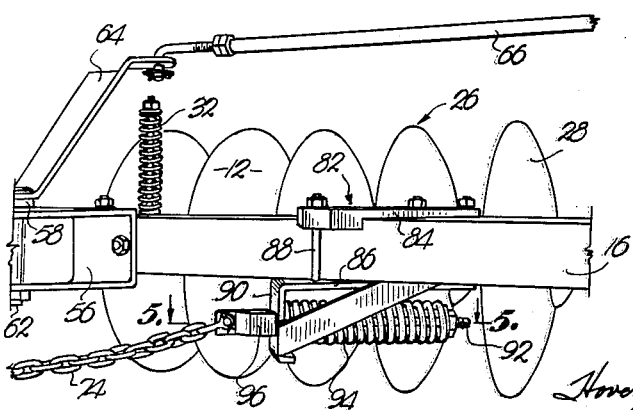

United States Patent Office 3,158,205
Patented Nov. 24, 1964

3,158,205
SEMIMOUNTED ONE-WAY PLOW
Glenn E. Frager and Francis H. Stansel, Hutchinson, Kans., assignors to Krause Corporation, Inc., Hutchinson, Kans., a corporation of Kansas
Filed Nov. 17, 1961, Ser. No. 152,986
6 Claims. (Cl. 172—285)

The present invention relates to improvements in agricultural implements, and more particularly, farm machinery that is normally placed in tow behind a tractor, the primary object being to advantageously utilize certain standard equipment of the tractor so that a portion of the implement is supported thereby, and so that turning in either direction is facilitated, while at the same time providing proper draft stabilization.

It is the most important object of the instant invention to provide means pivotally attaching an implement to the power lift of a tractor so that the latter serves as a partial support for the implement, and so that turns may be executed, while at the same time placing the implement in towing relationship to the tractor through use of a flexible towline connected with the swingable drawbar of the tractor so as to stabilize the pull in a manner to prevent maneuvering difficulties during execution of turns.

Other objects include the way in which a steering control for a caster wheel is operably coupled with a connection between the tractor and the implement; the manner of providing flexibility in the freedom of movement in the implement, not only because of the flexible towline, but because of the coil spring interposed therein; the way in which additional flexibility is provided in the coupling for tilting movement of the frame of the implement; and the manner of providing adjustments in the relationship of the implement to the tractor, the height of the implement. and the angularity of the tool which forms a part of the implement.

In the drawings:

FIG. 2 is a fragmentary, top perspective view illustrating the interconnected tractor and implement components;

FIG. 3 is a fragmentary, side perspective view between the tractor and the implement;

FIG. 4 is a fragmentary, perspective view similar to FIG. 3, looking rearwardly at one end of the implement.

Figures 1, 5:
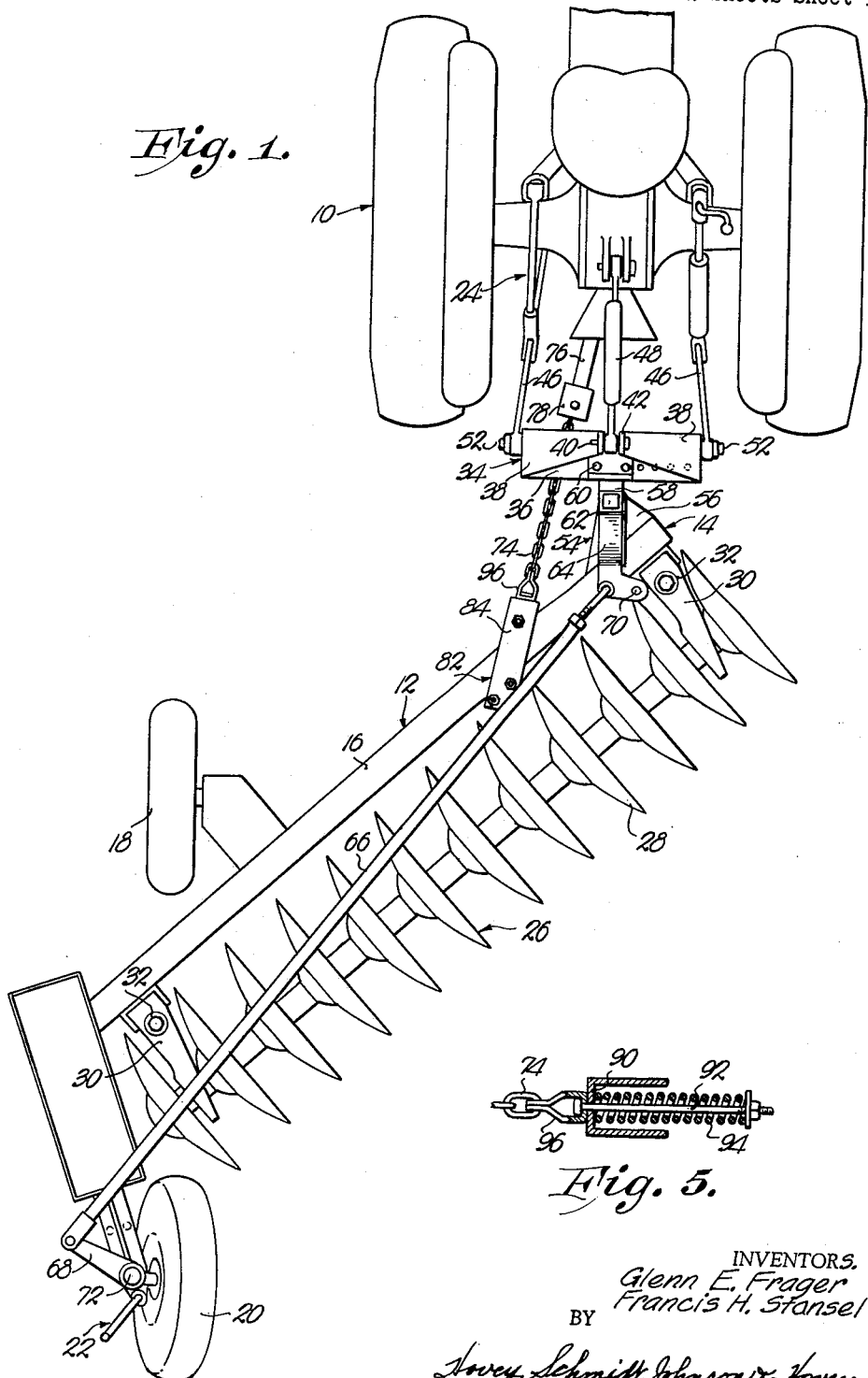
FIGURE 1 is a plan view of a semimounted one-way plow showing a tractor fragmentarily operably coupled therewith.
FIG. 5 is a detailed, cross-sectional view taken on line 5—5 of FIG. 4.

Tractor 10 is adapted to not only tow the implement 12 pursuant to the principles of the instant invention, but to support one end 14 of beam 16 forming a part of the frame of the implement 12. It cooperates therefore, in such support with land wheel 18 connected to beam 16 forwardly of the latter and intermediate its ends, and with a rear caster (furrow) wheel 20 also attached to the frame of the implement 12.

The frame of implement 12 may be raised and lowered by any suitable mechanism upon manipulation of hand crank 22 at the wheel 20, and by raising and lowering power lift 24 forming a part of the tractor 10, and when the implement 12 is in a road position the wheel 18 is lifted entirely off the ground.

Implement 12 chosen for illustration of the principles of the instant invention, is a one-way plow and, therefore, provided with a tillage tool 26 in the nature of a gang of discs 28 carried by the beam 16. In the particular plow illustrated, tool-supporting arms 30 are vertically swingable on the rearmost face of beam 16, the upward swinging of the gang of discs 28 being against the action of coil springs 32.

Partial connection of the implement 12 with the power lift 24 of tractor 10 is through a hitch broadly designated by the numeral 34, somewhat in the nature of a yoke, and including therefore, a horizontal towbar 36 whose longitudinal axis is disposed transversely to the normal path of travel of tractor 10. Such yoke includes also a pair of arms 38 rigid to the ends of the towbar 36, and extending upwardly therefrom, converging as the upper end of the yoke is approached. A bolt or the like 40 interconnects the upper ends of the arms 38.

The hitch 34 also includes a standard 42 coupled with the front face of towbar 36 for fore and aft swinging movement and having a bifurcated, uppermost end above the upper extremities of the arms 38. A U-shaped strap 44 rigid to the standard 42, extends loosely between the arms 38 and surrounds the bolt 40.

The power lift 24 includes a pair of vertically swingable, hydraulically powered links 46, and a single uppermost stabilizer link 48, the latter of which is provided with a pivotal coupling 50 with the bifurcations of standards 42. And, as best seen in FIG. 3, a number of pairs of openings may be provided in such bifurcations for adjustment purposes if so desired.

The arms 38 are interposed between the links 46 and provided with a coupling therewith in the nature of outwardly extending pins 52 that permit rotation of the towbar 36 substantially about its longitudinal axis, limited of course, by the extent of movement of the bolt 40 along the strap 44. A hinge connection, broadly designated by the numeral 54, is provided between the towbar 36 and the beam 16 adjacent the end 14 of the latter. One part of the link 54 is in the nature of a bracket 56 bolted or otherwise rigidly secured to the beam 16. The other part of the hinge 54 includes a substantially H-shaped clevis 58 that embraces the bracket 56 as well as the towbar 36. A pair of bolts 60 connect the clevis 58 with the towbar 36 within any selected pair of a plurality of openings in the towbar 36. A vertical hinge pin 62 interconnects the hinge parts 56 and 58 for swinging movement of the implement 12 relative to the tractor 10 about the vertical or upright axis of the hinge pin 62.

A steering control is provided for the caster wheel 20, including an upwardly and rearwardly inclined, substantially Z-shaped bar 64 rigid to the clevis 58 at the hinge pin 62, an extensible rod 66, and a crank 68. The rod 66 pivotally interconnects the crank 68 with the bar 64, the latter having an auxiliary hole 70 that receives the rod 66 when the implement is transported on the road. Manifestly, the crank 68 is rigid to the vertical caster shaft 72 of the wheel 20.

A flexible towline 74 which may consist of a link chain as illustrated, operably interconnects the beam 16 intermediate the ends of the latter, with drawbar 76 of the tractor 10, such drawbar 76 being freely swingable horizontally about a vertical pivot pin (not shown) at its forwardmost end beneath the tractor 10 as is well known. A joinder element 78 releasably attached to the drawbar 76, has a keyhole slot 80 for receiving one link of the chain 74, thereby permitting adjustment in the effective length of the towline 74.

The opposite end of the towline 74 is joined with the beam 16 through a bracket-type fastener 82. Fastener 82 includes uppermost and lowermost straps 84 and 86 respectively that are releasably clamped to the beam 16 by a plurality of bolts 88. Strap 86 has a downturned, forwardmost end plate 90 that slidably receives a bolt 92 passing therethrough and through a coil spring 94 behind the end plate 90. A clevis or the like 96 joins the towline 74 with the bolt 92.

During normal operation, both the right rear wheel of the tractor 10 and the caster wheel 20, ride in furrows when proper adjustment is made for the clevis 58 along the towbar 36, the proper relationship between the forwardmost disc 28 and the right rear tractor wheel depending upon the width of the tire of the latter. In other words, the relationship between the trail of the tractor 10 and the trail of the implement 12 is variable because of the row of openings for the bolts 60 in the towbar 36.

On the other hand, the width of the swath depends upon the angularity of the obliquely disposed beam 16 (and therefore, the gang of discs 28) with respect to the normal path of travel of the tractor 10 and the implement 12. Such width may be adjusted simply by loosening the bolts 88 and shifting the fastener 82 along the beam 16. A pivotal connection of the fastener 82 to the beam 16 may also be desirable. It is not believed necessary to illustrate in the drawings how such may be accomplished through use of a row of spaced openings along beam 16 and a pivot pin for the fastener 82 adapted to fit in a selected opening.

Manifestly, such angularity in the axis of rotation of the discs 28 also has some bearing upon the depth of cut; hence, it is but necessary to raise and lower the lift 24 and manipulate the crank 22 in order to provide depth control. However, rigidity between the tractor 10 and the implement 12 is, to some extent, eliminated by virtue of the fact that the towbar 36 is permitted to rotate to a limited extent as above explained. When the lift 24 is operated to raise the implement to a road position, bolt 40 will move to the position shown in FIG. 3 against the standard 42, thereby preventing backward typing of the implement about the aligned axes of pintles 52.

As best seen in FIG. 1, the tow line 74, and therefore, the drawbar 76, are normally on the line of draft and operate therefore, to pull the implement 12 in cooperation with the towing action imparted through the hinge connection 54. The extent to which the implement 12 tends to swing forwardly or rearwardly about the hinge pin 62, depends to a large extent on soil conditions and plowing depths. On the road, when the tool 26 is entirely out of the ground, the tendency is for implement 12 to swing rearwardly in a counterclockwise position about hinge pin 62, viewing FIG. 1. On the other hand, in heavy soils, and during relatively deep plowing, the tendency is for implement 12 to swing in the opposite direction, because of the inherent nature of the dish-shaped discs 28 and soil penetrating properties.

During normal operation therefore, changes in soil conditions result in a periodic fore and aft swinging of the implement 12 about pivot pin 62, notwithstanding the fact that the wheel 20 rides along for the most part and is guided by the furrow.

It is seen, therefore, that the flexibility of the towline 74 removes the rigidity between the implement and the tractor and permits the forward swinging of the implement. Conversely, the resiliency of the spring 94 permits the swinging of implement 12 in the opposite direction. All the while, the drawbar 76 is free to swing and maintain the alignment of the towline 74 with the line of draft.

In addition to the draft stabilization that is effected by such improvements, there is a distinct advantage during execution of turns since it is possible to turn the tractor 10 either to the left or to the right as may be desired. When a left turn is to be made, the flexibility of the towline 74 results in slack in the latter, and a swinging of the tractor 10 about the pivot pin 62 when the left turn is commenced. Hence, the wheel 20 need not be swung rearwardly as would be true during turns attempted when a completely rigid connection is made between the implement and the tractor. In other words, it is possible to effect a relatively sharp U-turn to the left and reverse directions of travel with the caster wheel 20 remaining virtually stationary and turning about a single point. The advantage of such construction is well appreciated when it is realized that substantial power and heavy, strong structure between the tractor and the implement is needed to effect turns that require the gang of discs 28 to move in a reverse direction.

When a right-hand turn is desired, the implement 12 is pulled around, not by effecting a strain on the power lift 24 and the hitch 34, but by the pulling action imparted to the beam 16 and, therefore, the entire implement 12 through the towline 74. Here again, the pull is advantageously cushioned because of the action of spring 94. Furthermore, when the turns are executed, the caster wheel 20 is guided or steered from the power lift 24 of tractor 10, through the hitch 34, the clevis 58, the bar 64, the rod 66, and the crank 68. Such turning action imparted on the wheel 20 is not so great as to produce a deleterious strain on the power lift 24.

It has been found that when the improvements of the instant invention are incorporated in the tractor and implement combination above described, an effective side draft control is provided without the disadvantage of the implement tending to swing or drive the tractor laterally in one direction or the other. Hence, insofar as the operator of the tractor is concerned, the difficulty of steering and maintaining the tractor within a desired and proper path of travel is appreciably lessened.

Having thus described the invention, what is claimed as new and desired to be secured by Letters Patent is:

1. In combination:
    (a) a tractor having a power lift and a horizontally swingable drawbar;
    (b) an implement having a frame extending rearwardly from the tractor and obliquely to the normal path of travel of the tractor and implement;
    (c) a hitch;
    (d) a coupling between the hitch and the lift and spaced from said drawbar;
    (e) a hinge connection between the hitch and one end of the frame, disposed for supporting said one end above the ground and for permitting swinging movement of the frame about an upright axis as the connection supports said end;
    (f) a towline;
    (g) a joinder between one end of the towline and the drawbar;
    (h) a fastener between the opposite end of the towline and the frame intermediate the ends of the latter whereby the tractor pulls the implement during advancement of the tractor, said fastener being disposed on the frame to normally place the drawbar and the towline on a line of draft that is in angular relationship to said path of travel; and
    (i) a yieldable device interposed in said towline, permitting limited swinging movement of the frame in one direction about said axis.

2. In combination:
    (a) a tractor having a power lift and a horizontally swingable drawbar;

(b) an implement having a frame extending rearwardly from the tractor and obliquely to the normal path of travel of the tractor and implement;
(c) a hitch;
(d) a coupling between the hitch and the lift and spaced from said drawbar;
(e) a hinge connection between the hitch and one end of the frame, disposed for supporting said one end above the ground and for permitting swinging movement of the frame about an upright axis as the connection supports said end;
(f) a towline;
(g) a joinder between one end of the towline and the drawbar;
(h) a fastener between the opposite end of the towline and the frame intermediate the ends of the latter whereby the tractor pulls the implement during advancement of the tractor, said fastener being disposed on the frame to normally place the drawbar and the towline on a line of draft that is in angular relationship to said path of travel, said towline being flexible, permitting the frame to swing in one direction about said axis; and
(i) a yieldable device interposed in said towline, permitting limited swinging movement of the frame in the opposite direction about said axis.

3. In combination:
(a) a tractor having a power lift and a horizontally swingable drawbar;
(b) an implement having a frame extending rearwardly from the tractor and obliquely to the normal path of travel of the tractor and implement;
(c) a hitch;
(d) a coupling between the hitch and the lift and spaced from said drawbar rearwardly of the axis of movement thereof;
(e) a hinge connection between the hitch and one end of the frame, disposed for supporting said one end above the ground and for permitting swinging movement of the frame about an upright axis as the connection supports said end;
(f) a towline;
(g) a joinder between one end of the towline and the drawbar;
(h) a fastener between the opposite end of the towline and the frame intermediate the ends of the latter whereby the tractor pulls the implement during advancement of the tractor, said fastener being releasably mounted on the frame, permitting the same to be shifted along the frame to vary the angularity of the frame relative to said path of travel, said fastener being disposed on the frame to normally place the drawbar and the towline on a line of draft that is in angular relationship to said path of travel, said towline being flexible, permitting the frame to swing in one direction about said axis; and
(i) a yieldable device interposed in said towline adjacent said opposite end, permitting limited swinging movement of the frame in the opposite direction about said axis.

4. In combination:
(a) a tractor having a power lift and a horizontally swingable drawbar;
(b) an implement having a frame extending rearwardly from the tractor and obliquely to the normal path of travel of the tractor and implement;
(c) a hitch having an elongated towbar disposed horizontally in transverse relationship to the normal path of travel of the tractor and in spaced relationship to said drawbar;
(d) a coupling between the hitch and the lift;
(e) a hinge connection between the towbar and one end of the frame, disposed for supporting said one end above the ground and for permitting swinging movement of the frame about an upright axis as the connection supports said end, said connection being releasably mounted on the towbar, permitting the same to be shifted along the towbar to vary the relationship between the trail of the implement and the trail of the tractor;
(f) a towline;
(g) a joinder between one end of the towline and the drawbar;
(h) a fastener between the opposite end of the towline and the frame intermediate the ends of the latter whereby the tractor pulls the implement during advancement of the tractor, said fastener being disposed on the frame to normally place the drawbar and the towline on a line of draft that is in angular relationship to said path of travel, said towline being flexible, permitting the frame to swing in one direction about said axis; and
(i) a yieldable device interposed in said towline adjacent said opposite end, permitting limited swinging movement of the frame in the opposite direction about said axis.

5. In combination:
(a) a tractor having a power lift and a horizontally swingable drawbar;
(b) an implement having a frame extending rearwardly from the tractor and obliquely to the normal path of travel of the tractor and implement;
(c) a hitch having an elongated towbar disposed horizontally in transverse relationship to the normal path of travel of the tractor and in spaced relationship to said drawbar rearwardly of the axis of swinging movement thereof;
(d) a coupling between the hitch and the lift;
(e) a hinge connection between the towbar and one end of the frame, disposed for supporting said one end above the ground and for permitting swinging movement of the frame about an upright axis as the connection supports said end;
(f) a towline;
(g) a joinder between one end of the towline and the drawbar;
(h) a fastener between the opposite end of the towline and the frame intermediate the ends of the latter whereby the tractor pulls the implement during advancement of the tractor, said fastener being disposed on the frame to normally place the drawbar and the towline on a line of draft that is in angular relationship to said path of travel, said towline being flexible, permitting the frame to swing in one direction about said axis; and
(i) a yieldable device interposed in said towline adjacent said opposite end, permitting limited swinging movement of the frame in the opposite direction about said axis, said coupling including a pivotal movement of the towbar on the lift for rotation of the towbar about its longitudinal axis, said lift having means connected with the hitch permitting limited rotation of the towbar and, therefore, limited vertical swinging of said connection and said frame relative to the lift.

6. In combination:
(a) a tractor having a power lift and a horizontally swingable drawbar;
(b) an implement having a frame extending rearwardly from the tractor and obliquely to the normal path of travel of the tractor and implement;
(c) a hitch;
(d) a coupling between the hitch and the lift and spaced from said drawbar;
(e) a hinge connection between the hitch and one end of the frame, disposed for supporting said one end above the ground and for permitting swinging movement of the frame about an upright axis as the connection supports said end;
(f) a towline;

(g) a joinder between one end of the towline and the drawbar;

(h) a fastener between the opposite end of the towline and the frame intermediate the ends of the latter whereby the tractor pulls the implement during advancement of the tractor, said fastener being pivotally connected to the frame and disposed to normally place the drawbar and the towline on a line of draft that is in angular relationship to said path of travel, said towline being flexible, permitting the frame to swing in one direction about said axis;

(i) a yieldable device interposed in said towline, permitting limited swinging movement of the frame in the opposite direction about said axis;

(j) a caster wheel supporting the opposite end of the frame; and (k) a steering control for said wheel operably joining the latter and said connection.

References Cited by the Examiner
UNITED STATES PATENTS

| | | | |
|---|---|---|---|
| 1,896,532 | 2/33 | Vlardi | 280—459 |
| 1,960,132 | 5/34 | Wright | 172—679 XR |
| 2,237,884 | 4/41 | Lysedahl | 172—320 |
| 2,370,374 | 2/45 | Silver | 172—600 |
| 2,377,410 | 6/45 | Field | 172—599 XR |
| 2,462,726 | 2/49 | Currie. | |
| 2,759,310 | 8/56 | Newkirk | 280—467 XR |
| 2,963,098 | 12/60 | Kesselring | 172—677 XR |

T. GRAHAM CRAVER, *Primary Examiner.*

A. JOSEPH GOLDBERG, RUSSELL R. KINSEY,
*Examiners.*